(12) United States Patent
Hayashi et al.

(10) Patent No.: US 6,347,014 B1
(45) Date of Patent: Feb. 12, 2002

(54) ILLUMINATION OPTICAL SYSTEM AND PROJECTION-TYPE IMAGE DISPLAY APPARATUS

(75) Inventors: Kohtaro Hayashi, Toyonaka; Yasumasa Sawai, Yamatotakada; Kenji Konno, Sakai, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/457,284

(22) Filed: Dec. 8, 1999

(30) Foreign Application Priority Data

Dec. 10, 1998 (JP) .............................. 10-351283

(51) Int. Cl.$^7$ ................. G02B 27/14; G03B 21/14; G03B 21/00; G03B 21/26
(52) U.S. Cl. .................. 359/634; 353/20; 353/31; 353/34
(58) Field of Search .................. 359/634; 353/30, 353/31, 34, 37, 80, 20; 355/31

(56) References Cited

U.S. PATENT DOCUMENTS

| | | | |
|---|---|---|---|
| 5,622,418 A | * 4/1997 | Daijogo et al. | 353/97 |
| 5,729,306 A | * 3/1998 | Miyake et al. | 349/9 |
| 5,777,804 A | * 7/1998 | Nakamura et al. | 359/727 |
| 6,005,655 A | * 12/1999 | Mushiake et al. | 355/31 |

FOREIGN PATENT DOCUMENTS

JP 06-281881 A 10/1994

* cited by examiner

*Primary Examiner*—Georgia Epps
*Assistant Examiner*—Gary O'Neill
(74) *Attorney, Agent, or Firm*—Sidley Austin Brown & Wood

(57) ABSTRACT

An illumination optical system has a light source that emits white light having random polarization planes, a polarization separation device that separates the light from the light source into two types of light having polarization planes perpendicular to each other and traveling in directions at an angle to each other, a wavelength-specific polarization conversion device that receives the two types of light thus separated and that then subjects the light of a particular wavelength range included in them to polarization conversion, a convergence optical system that receives the two types of light after the light of the particular wavelength range included therein has undergone polarization conversion and that then makes them converge on different convergence positions, and a half-wave plate disposed near one of those convergence positions. This illumination optical system outputs white light that has different polarization planes in a particular wavelength range and in other wavelength ranges, and thus, when the light is subjected to color separation by being separated into light of the particular wavelength range and light of other wavelength ranges, the difference of the polarization planes serves to prevent loss of the amount of light.

17 Claims, 12 Drawing Sheets

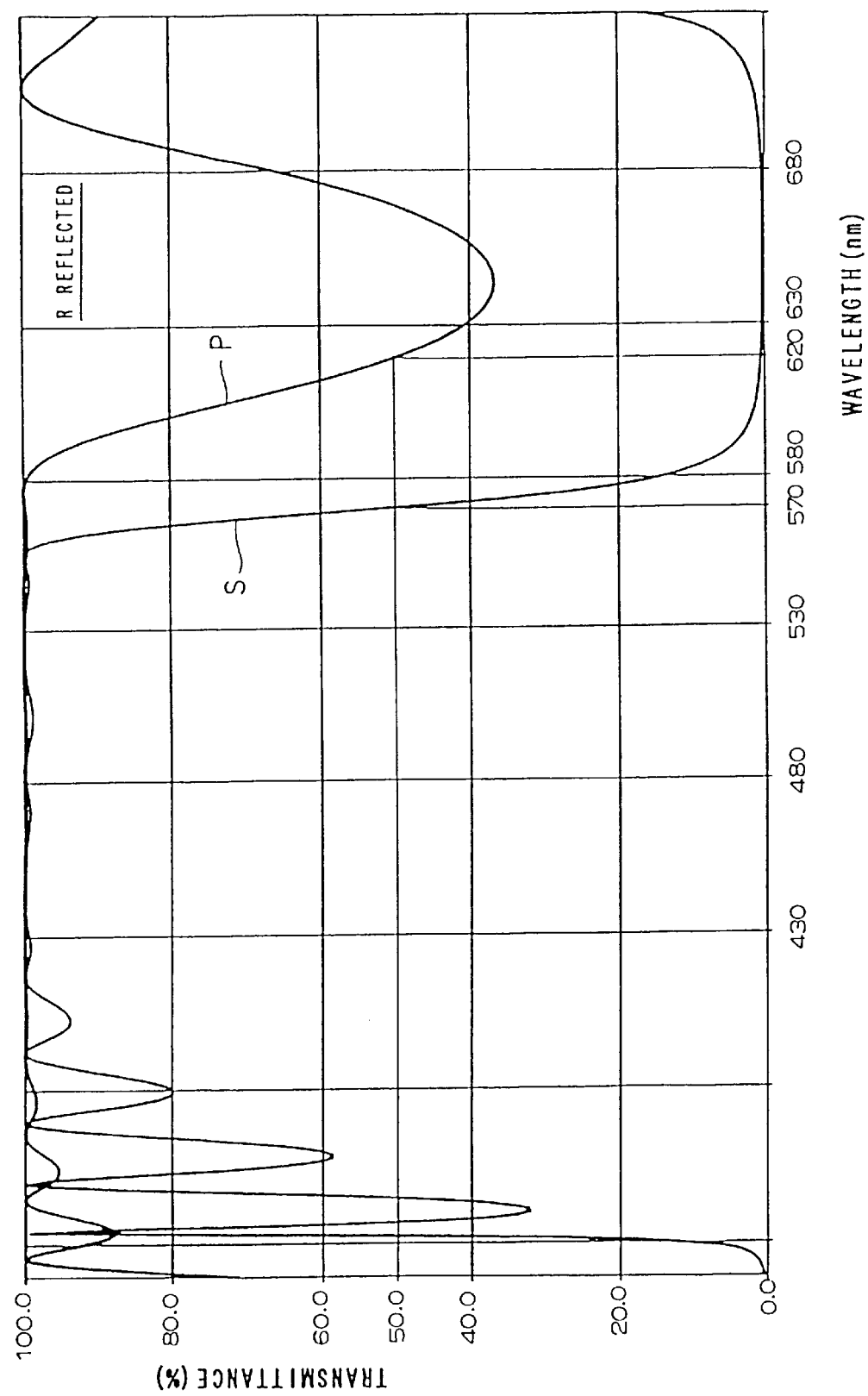

ILLUMINATION OPTICAL SYSTEM AND PROJECTION-TYPE IMAGE DISPLAY APPARATUS

This application is based on application No. H10-351283 filed in Japan on Dec. 10, 1998, the entire content of which is hereby incorporated by reference.

BACKGROUND OF THE INVENTION

1. Field of the Invention

The present invention relates to an illumination optical system for use in an optical apparatus such as a projection-type image display apparatus, and more particularly to an illumination optical system that makes uniform the polarization plane of the light emitted from a light source.

2. Description of the Prior Art

FIG. 12 shows an example of the construction of a conventional projection-type image display apparatus. This projection-type image display apparatus adopts an illumination method of a separate-pupils type, and is provided with an illumination optical system 90, a cross dichroic prism 98 that serves both to separate and to integrate colors, three reflection-type liquid crystal panels 99R, 99G, and 99B, and a projection optical system 100. Moreover, a total-reflection mirror 101 for directing illumination light to the liquid crystal panels 99R, 99G, and 99B is provided at the pupil position of the projection optical system 100. The illumination optical system 90 is composed of a lamp 91 serving as a light source, a reflector 92, a UV/IR cut filter 93, a concave lens 94, an integrator 95, a polarization separation prism 96, and a half-wave plate 97.

The lamp 91 emits white light having random polarization planes. The reflector 92 reflects the light coming from the lamp 91 in such a way as to form it into a converging beam. The UV/IR cut filter 93 transmits only visible light. The concave lens 94 forms the light coming from the reflector 92 into a parallel beam and directs it to the integrator 95.

The integrator 95 is composed of a first lens array 95a and a second lens array 95b, each having a plurality of lens cells, and the polarization separation prism 96 is disposed between these lens arrays 95a and 95b. The lens cells of the first lens array 95a individually focus the light coming from the concave lens 94 in the vicinity of the corresponding lens cells of the second lens array 95b, and the lens cells of the second lens array 95b individually direct the light passing therethrough to the whole surfaces of the liquid crystal panels 99R, 99G, and 99B.

The polarization separation prism 96 is provided with a polarization separation surface 96a that reflects S-polarized light and transmits P-polarized light and a total-reflection surface 96b. The light having random polarization planes that has passed through the first lens array 95a is then separated into S-polarized light, which is reflected from the polarization separation surface 96a, and P-polarized light, which is transmitted through the polarization separation surface 96a. The P-polarized light is then reflected from the total-reflection surface 96b so as to travel in the same direction as the S-polarized light reflected from the polarization separation surface 96a, and then these two types of light enter adjoining lens cells of the second lens array 95b. The half-wave plate 97 is provided on the lens cells that receive the P-polarized light, and serves to convert the received P-polarized light into S-polarized light. Thus, the whole of the light originating from the illumination optical system 90 is now S-polarized.

The projection optical system 100 is composed of a front unit 100a, a rear unit 100b, and an aperture stop 100c. The pupil of the projection optical system 100 is located between the front unit 100a and the rear unit 100b, where the total reflection mirror 101 is so disposed as to close half of the pupil. The aperture stop 100c is disposed in the vicinity of the total-reflection mirror 101. The cross dichroic prism 98 has a dichroic surface 98R that selectively reflects red (R) light and a dichroic surface 98B that selectively reflects blue (B) light, and the liquid crystal panels 99R, 99G, and 99B are so arranged as to face the cross dichroic prism 98 each from a different direction.

The illumination light L1 coming from the illumination optical system 90 is reflected from the total-reflection mirror 101, then travels through the rear unit 100b to enter the cross dichroic prism 98, and is then separated into R light, which is reflected from the dichroic surface 98R, B light, which is reflected from the dichroic surface 98B, and green (G) light, which is transmitted through the dichroic surfaces 98R and 98B. The thus separated R, G, and B light illuminates the liquid crystal panels 99R, 99G, and 99B, respectively, and is reflected therefrom; meanwhile, the R, G, and B light is modulated by the corresponding liquid crystal panels 99R, 99G, and 99B in accordance with the light components of the corresponding colors of the image to be displayed.

The R, G, and B light reflected from and thereby modulated by the liquid crystal panels 99R, 99G, and 99B then enters the cross dichroic prism 98 again, and is integrated together by being reflected by or transmitted through the dichroic surfaces 98R and 98B so as to be formed into projection light L2. The projection light L2 travels along a path symmetrical with the path of the illumination light Li with respect to the optical axis of the projection optical system 100, and is then projected through the projection optical system 100 with enlargement. The projection optical system 100 focuses the projection light L2 on a screen (not shown) and thereby displays a color image thereon.

In this projection-type image display apparatus, the whole of the illumination light L1 is S-polarized when it enters the cross dichroic prism 98. Now, suppose that the cutoff wavelength, at which the transmittance of the cross dichroic prism 98 for S-polarized light equals to 50% is, for example, 580 nm on the dichroic surface 98R and 510 nm on the dichroic surface 98B. Then, the G light that illuminates the liquid crystal panel 99G covers a wavelength range from 510 to 580 nm, and its energy at wavelengths 510 and 580 nm is 50% of the energy it has before entering the cross dichroic prism 98.

The G light, after being reflected from the liquid crystal panel 99G so as to be formed into the projection light L2, passes through the dichroic surfaces 98R and 98B again. Here again, only 50% of the light having wavelengths of 510 and 580 nm is transmitted, and therefore the projection light, when it reaches the screen, has only 25% of its original energy at those wavelengths. Thus, the wavelength range of the G light included in the projection light is narrowed down to, for example, from 520 to 570 nm, within which the transmittance on the dichroic surfaces 98R and 98B is 70% or more (i.e. 50% or more on a two-way basis).

The same is true with the R and B light. Specifically, whereas the wavelength ranges of the illumination light L depend on the wavelengths at which the reflectance on the dichroic surfaces 98R and 98B equals to 50% (i.e. the R light covers a wavelength range from 580 nm and above, and the B light covers a wavelength range from 510 nm and below), the wavelength ranges of the projection light L2 depend on the wavelengths at which the reflectance on the dichroic surfaces 98R and 98B equals to 70% (i.e. 50% on a two-way basis); for example, the R light covers a wavelength range from 590 nm and above, and the B light covers a wavelength range from 500 nm and below.

The specific values given above are simply estimates obtained for principal rays. In general, the characteristics of a dichroic surface depend on the angle of incidence of rays, and the transmittance and reflectance for rays incident on the dichroic surface at different angles from principal rays vary from the transmittance and reflectance for principal rays. If such variation is taken into consideration, the wavelength ranges of the R, G, and B light are narrowed down further.

Thus, the projection-type image display apparatus described above suffers from loss of the energy of light, i.e. loss of the amount of light, around the boundary wavelengths for color separation, i.e. in the wavelength ranges around the cutoff wavelengths. As shown in FIG. 13, the light thus lost becomes stray light L3 that repeats reflection and transmission in and around the cross dichroic prism 98. This stray light L3 may appear as a ghost or act to lower contrast, degrading the quality of the image displayed.

SUMMARY OF THE INVENTION

An object of the present invention is to provide an illumination optical system that supplies illumination light that does not cause loss of the amount of light when subjected to color separation and color integration, and to provide a projection-type image display apparatus that employs such an illumination optical system and that thus offers bright and high-quality images.

To achieve the above object, according to one aspect of the present invention, an illumination optical system is provided with: a polarization separation device for separating white light emitted from a light source and having random polarization planes into a first type of light and a second type of light polarized on different planes from each other and traveling in different directions from each other; a polarization plane conversion device for rotating the polarization plane of light of a particular wavelength range included in the first and second types of light; a convergence optical system for making the first and second types of light converge on first and second convergence positions, respectively; and a half-wave plate, disposed near one of the first and second convergence positions, for rotating the polarization plane of the first or second type of light that converges on that convergence position.

According to another aspect of the present invention, a projection-type image display apparatus is provided with: an illumination optical system as described above; a display device for displaying an image in accordance with image data fed thereto so as to modulate light in accordance with the image thus displayed; a first optical system for directing the light output from the illumination optical system to the display device; and a second optical system for projecting the light output from the display device.

According to still another aspect of the present invention, an optical system is provided with: a polarization device for polarizing white light emitted from a light source and having random polarization planes in such a way as to convert the light into light having a predetermined polarization plane; and a polarization plane conversion device for converting the polarization plane of light of a particular wavelength range included in the light polarized by the polarization device in such a way that the light of the particular wavelength range has a different polarization plane from light of other wavelength ranges.

BRIEF DESCRIPTION OF THE DRAWINGS

This and other objects and features of the present invention will become clear from the following description, taken in conjunction with the preferred embodiments with reference to the accompanying drawings in which:

FIG. 8 is a diagram showing the spectral transmittance of the dichroic surface, for reflecting R light, of the cross dichroic prism employed in the first embodiment;

DESCRIPTION OF THE PREFERRED EMBODIMENTS

Figure 1:
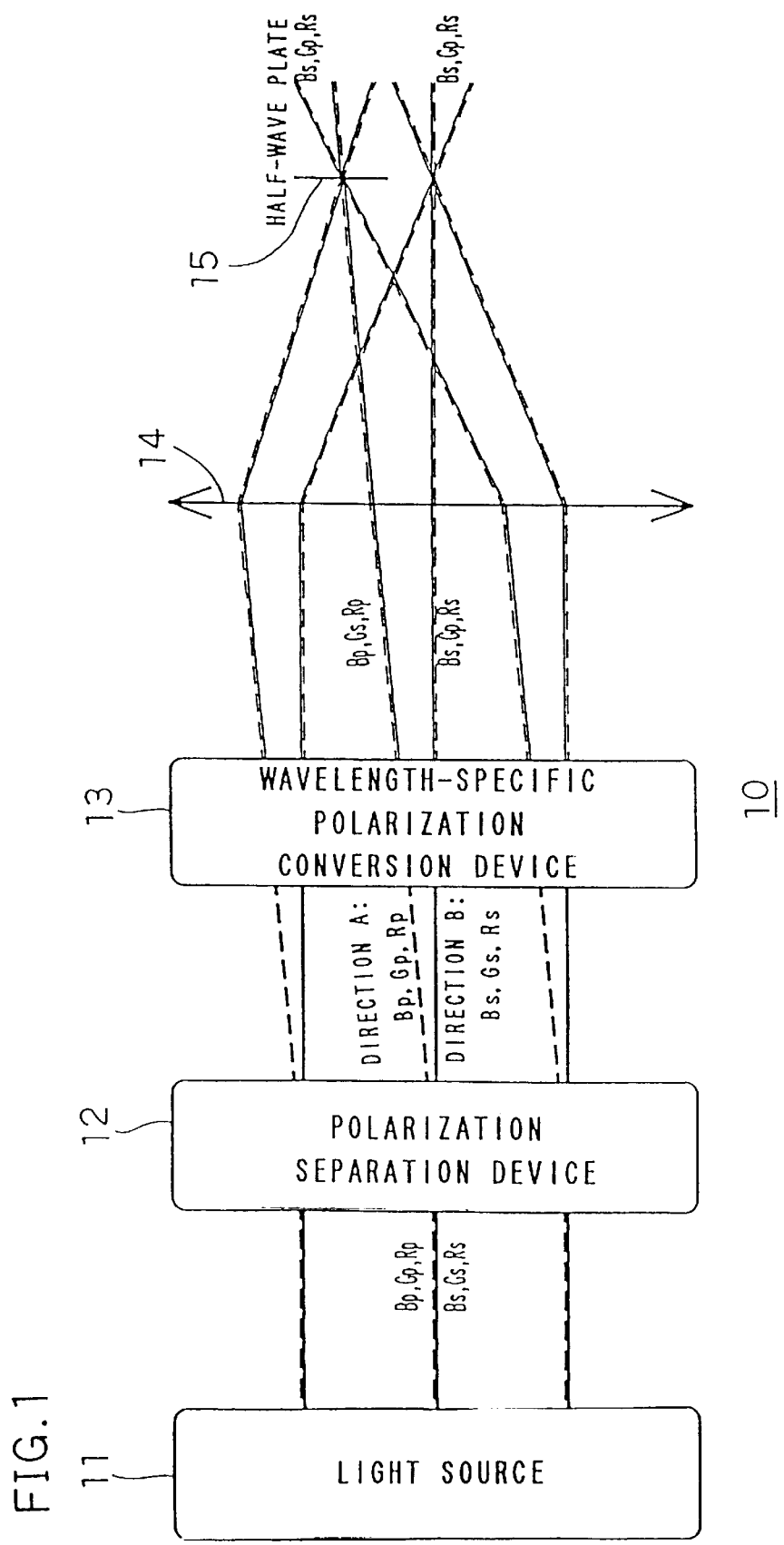
FIG. 1 is a diagram schematically illustrating the principle of illumination optical systems embodying the invention.

Hereinafter, the present invention will be described with reference to the accompanying drawings. FIG. 1 schematically illustrates the principle of an illumination optical system 10 embodying the present invention. The illumination optical system 10 is provided with a light source 11, a polarization separation device 12, a wavelength-specific polarization conversion device 13, a convergence optical system 14, and a half-wave plate 15. The light source 11 emits white light, which spreads over a wavelength range including all of the wavelength ranges of R, G, and B light. Moreover, the light emitted from the light source 11 has random polarization planes, and thus includes S-polarized and P-polarized light components having polarization planes perpendicular to each other. In the following descriptions, P-polarized R, G, and B light will be represented by $R_P$, $G_P$, and $B_P$, respectively, and S-polarized R, G, and B light will be represented by $R_S$, $G_S$, and $B_S$, respectively.

The light $R_P$, $G_P$, $B_P$, $R_S$, $G_S$, and $B_S$ from the light source 11 is first separated by the polarization separation device 12 into two groups of light traveling in different directions at an angle to each other, namely a group of P-polarized light $R_P$, $G_P$, and $B_P$ traveling in one direction indicated by A and a group of S-polarized light $R_S$, $G_S$, and $B_S$ traveling in another direction indicated by B. The thus separated groups of P-polarized light $R_P$, $G_P$, and $B_S$, on the one hand, and S-polarized light $R_S$, $G_S$ and $B_S$, on the other hand, both enter the wavelength-specific polarization conversion device 13.

The wavelength-specific polarization conversion device 13 changes the polarization plane of light of a particular wavelength range without changing the polarization plane of light of other wavelength ranges. FIG. 1 shows a case in which the wavelength range of G light is treated as the particular wavelength range and the polarization plane of G light is rotated through 90°. Here, P-polarized G light $G_p$ is converted into S-polarized G light $G_S$ and S-polarized G light $G_S$ is converted into P-polarized G light $G_p$; meanwhile, the other light $R_P$, $B_P$, $R_S$, and $B_S$ remains intact. Accordingly, the wavelength-specific polarization conversion device 13 outputs two groups of light, namely a group of light $R_P$, $G_S$, and $B_P$, on the one hand, and a group of light $R_S$, $G_P$, and $B_S$, on the other hand. The wavelength-specific polarization conversion device 13 performs polarization conversion as described above without changing the angle between the directions along which those two groups of light travel.

All of the light exiting from the wavelength-specific polarization conversion device 13 enters the convergence optical system 14, by which the light is made to converge on predetermined convergence positions. Since the polarization separation device 12 separates light into two types of light having different polarization planes in such a way that the two types of light travel in different directions at an angle to each other, and the wavelength-specific polarization conversion device 13 maintains this angle, the group of light $R_P$, $G_S$, and $B_P$, and the group of light $R_S$, $G_P$, and $B_S$ converge on different convergence positions. At the convergence position of the group of light $R_P$, $G_S$, and $B_P$, is disposed the half-wave plate 15 so that, as the light passes through the half-wave plate 15, the polarization plane of the light will be rotated through 90°, with the result that P-polarized R light $R_P$, S-polarized G light $G_S$, and P-polarized B light $B_p$ is converted into S-polarized R light $R_S$, P-polarized G light $G_P$, and S-polarized B light $B_S$, respectively. Accordingly, the illumination optical system 10 outputs white light that includes only S-polarized R light $R_S$, P-polarized G light $G_P$, and S-polarized B light $b_S$.

It is to be understood that the particular wavelength range does not necessarily have to be the wavelength range of G light, but may be the wavelength range of, for example, R light, B light, or even yellow light. It is also to be noted that the half-wave plate 15 may be disposed at either of the two convergence positions. In practice, the particular wavelength range and the position of the half-wave plate 15 are determined to suit the application of the illumination optical system 10.

Figure 2:
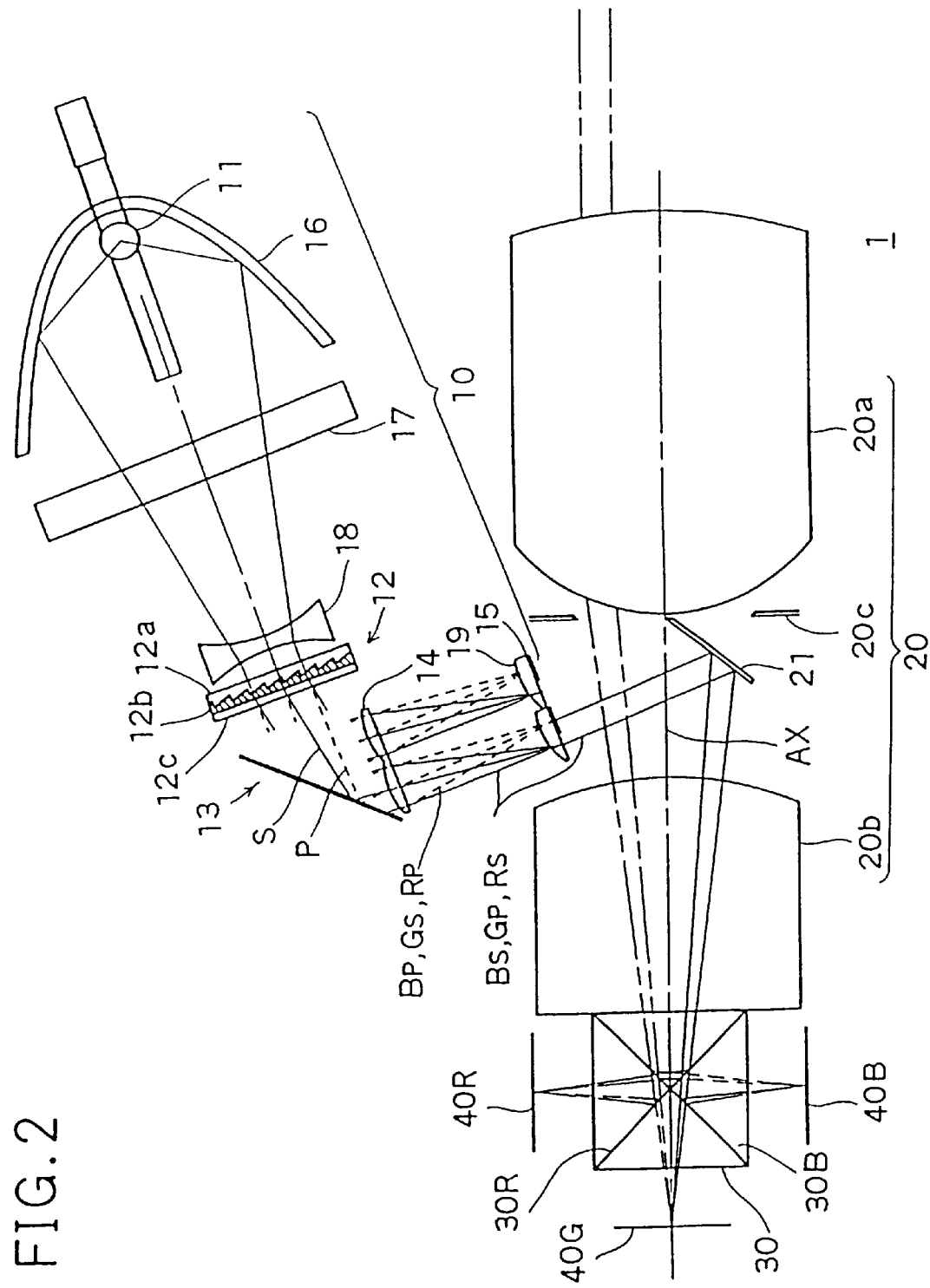
FIG. 2 is a diagram showing the overall construction of the optical system of the projection-type image display apparatus of a first embodiment of the invention.

Hereinafter, as embodiments of the present invention, projection-type image display apparatuses (hereafter also referred to simply as projection display apparatuses) provided with an illumination optical system 10 that functions as described above will be described. FIG. 2 shows the overall construction of the optical system of the projection-type image display apparatus 1 of a first embodiment of the invention. In this projection display apparatus 1, the white light supplied from the illumination optical system 10 is subjected to color separation so as to be separated into R, G, and B light, and then the thus separated R, G, and B light illuminates three liquid crystal panels individually, and then the light modulated by those three liquid crystal panels individually is integrated together and projected so as to form a color image.

The projection display apparatus 1 is provided with, in addition to the illumination optical system 10, a projection optical system 20, a cross dichroic prism 30, and three reflection-type liquid crystal panels 40R, 40G, and 40B. The projection display apparatus 1 adopts an illumination method of a separate-pupils type, and has a total-reflection mirror 21 provided within the projection optical system 20. This total-reflection mirror 21 receives the light coming from the illumination optical system 10 and directs it to the cross dichroic prism 30.

The illumination optical system 10 is composed of a light source 11, a polarization separation device 12, a wavelength-specific polarization conversion device 13, a convergence optical system 14, half-wave plates 15, a reflector 16, a UV/IR cut filter 17, a concave lens 18, and a lens array 19. The light source 11 is an arc discharge lamp such as a metal halide lamp, and emits white light that has random polarization planes and that spreads over the entire wavelength range of visible light.

The reflector 16 has an ellipsoid surface, and at the first focus thereof is disposed the light source 11. The reflector 16 reflects the light emitted from the light source 11 in such a way as to focus the light on the second focus of the reflector 16. The UV/IR cut filter 17 eliminates light components having wavelengths corresponding to the ultraviolet and infrared regions from the light emitted from the light source 11. The concave lens 18 is disposed between the reflector 16 and the second focus thereof, and serves to form the converging beam of light emanating from the reflector 16 into a parallel beam and direct it to the polarization separation device 12.

The polarization separation device 12 is provided with a birefringent diffractive optical element, and separates the light coming from the concave lens 18 and having random polarization planes into P-polarized light and S-polarized light that travel in different directions at a predetermined angle to each other. The wavelength-specific polarization conversion device 13 is provided with an optical element having a dichroic surface and a quarter-wave plate, and serves to separate light of a particular wavelength range by the action of the dichroic surface and perform polarization conversion thereon by the action of the quarter-wave plate. In the projection display apparatus 1, the wavelength range of G light is treated as the particular wavelength range, and thus the wavelength-specific polarization conversion device 13 converts P-polarized G light into S-polarized G light and converts S-polarized G light into P-polarized G light. Accordingly, the P-polarized and S-polarized light separated by the polarization separation device 12 is respectively converted into a group of light $R_P$, $G_S$, and $B_P$, on the one hand, and a group of light $R_S$, $G_P$, and $B_S$, on the other hand. The structures and the actual characteristics of the polarization separation device 12 and the wavelength-specific polarization conversion device 13 will be described in detail later.

The convergence optical system 14 is a lens array composed of a plurality of lens cells arranged in a two-dimensional array. The convergence optical system 14, together with the lens array 19 similarly composed of a plurality of lens cells arranged in a two-dimensional array, constitutes an integrator. The lens array constituting the convergence optical system 14, which serves as a first lens array of the integrator, focuses the light coming from the wavelength-specific polarization conversion device 13 in the vicinity of the lens array 19, which serves as a second lens array of the integrator.

The light coming from the individual lens cells of the first lens array 14 form images on the corresponding lens cells of the second lens array 19. From the wavelength-specific polarization conversion device 13 come two groups of light that travel in different directions, namely a group of light $R_P$, $G_S$, and $B_P$, on the one hand, and a group of light $R_S$, $G_P$, and $B_S$, on the other hand, and therefore these two groups of light form two light-source images away from each other on the individual lens cells of the second lens array 19.

The lens cells of the second lens array 19 are each so designed that the light passing therethrough illuminates the whole surfaces of the liquid crystal panels 40R, 40G, and 40B, and thus the light from all of the lens cells of the second lens array 19 is superimposed on one another on each of the liquid crystal panels. The light reflected from the reflector 16 has different intensities at the center and at the edge of the beam, and thus the amount of light passing through the lens cells closer to the center of the lens array 19 and the amount of light passing through the lens cells closer to the edge thereof differ. However, since the light from all of the lens cells is superimposed on one another on each of the liquid crystal panels, the whole surface of each of the liquid crystal panels is illuminated with uniform brightness.

The lens cells of the second lens array 19 are each so formed as to be decentered so that the two light source-images formed away from each other can each illuminate the whole surfaces of the liquid crystal panels 40R, 40G, and 40B.

The half-wave plates 15 are disposed on the exiting surface of the second lens array 19, and are placed in the vicinity of the convergence position of the light $R_P$, $G_S$, and $B_P$. Accordingly, the illumination optical system 10 as a whole outputs light including only S-polarized R light $R_S$, S-polarized B light $B_S$, and P-polarized G light $G_P$.

The projection optical system 20 is composed of a front unit 20a, a rear unit 20b, and an aperture stop 20c, and has a pupil between the front unit 20a and the rear unit 20b. At the pupil position, the total-reflection mirror 21 is disposed at an angle to the optical axis Ax of the projection optical system 20 in such a way as to close half of the pupil. The aperture stop 20c is disposed in the vicinity of the pupil position.

The second lens array 19 of the illumination optical system 10 is disposed close to the projection optical system 20. Therefore, the light exiting from the second lens array 19 directly strikes the total-reflection mirror 21 without being focused on the way, and is then reflected by the total-reflection mirror 21 so as to enter the projection optical system 20. The light reflected from the total-reflection mirror 21 passes through one of the two halves of the rear unit 20b divided by a plane including the optical axis Ax, exits from the rear end of the rear unit 20b, and then illuminates the liquid crystal panels 40R, 40G, and 40B, thus serving as illumination light.

The cross dichroic prism 30 is composed of four triangular prisms of an identical size having a rectangular-equilateral-triangle-shaped cross section. The four triangular prisms are cemented together at the mutually perpendicular surfaces of each. At one of the resulting two cementing surfaces that are perpendicular to each other is formed a dichroic surface 30R that selectively reflects R light and transmits G light and B light, and at the other is formed a dichroic surface 30B that selectively reflects B light and transmits R light and G light. The cross dichroic prism 30 is disposed close to the rear end of the rear unit 20b of the projection optical system 20 in such a way that the center of the cross dichroic prism 30 lies on the optical axis Ax of the projection optical system 20. The dichroic surfaces 30R and 30B are arranged at 45° to the optical axis Ax.

The liquid crystal panel 40G is arranged perpendicularly to the optical axis Ax of the projection optical system 20, and the liquid crystal panels 40R and 40B are arranged perpendicularly to the optical axis Ax as turned by the dichroic surfaces 30R and 30B, respectively. The liquid crystal panels 40R, 40G, and 40B are arranged in such a way that the center thereof lies on the optical axis Ax or the turned optical axis Ax and that the optical path lengths from the rear end of the rear unit 20b of the projection optical system 20 to the liquid crystal panels 40R, 40G, and 40B are equal.

The liquid crystal panels 40R, 40G, and 40B are individually provided with driving circuits (not shown). These driving circuits drive the corresponding liquid crystal panels 40R, 40G, and 40B in accordance with image signals conveying the R, G, and B light components, respectively, of an image.

The light coming from the total-reflection mirror 21 and exiting from the rear unit 20b of the projection optical system 20 enters the cross dichroic prism 30. This light includes S-polarized R light $R_S$, P-polarized G light $G_P$, and S-polarized B light $B_S$. Of these light components, the R light $R_S$ is reflected from the dichroic surface 30R and then illuminates the liquid crystal panel 40R. Similarly, the B light $B_S$ is reflected from the dichroic surface 30B and then illuminates the liquid crystal panel 40B. On the other hand, the G light $G_P$ is transmitted through the two dichroic surfaces 30R and 30B and then illuminates the liquid crystal panel 40G.

The R light $R_S$, G light $G_P$, and B light $B_S$ illuminating the liquid crystal panels 40R, 40G, and 40B is reflected from reflection surfaces provided individually on the rear side of the liquid crystal panels, and is, while passing through the liquid crystal layers, modulated in accordance with the image signals so as to be converted partially into P-polarized R light $R_P$, S-polarized G light $G_S$, and P-polarized B light $B_P$, respectively. The liquid crystal panels 40R and 40B are each, on the front side thereof, provided with a polarization plate that shields P-polarized light, and the liquid crystal panel 40G is, on the front side thereof, provided with a polarization plate that shields S-polarized light. The illumination light, i.e. R light $R_S$, G light $G_P$, and B light $B_S$, is transmitted through these polarization plates; by contrast, those components of the light reflected from the liquid crystal panels which are produced as the result of modulation, i.e. R light $R_P$, G light $G_S$, and B light $B_P$ are shielded by the polarization plate. Thus, the light that will later be integrated together so as to be formed into projection light includes the same light components as the illumination light in terms of polarization.

The R light $R_S$, G light $G_P$, and B light $B_S$ reflected from the liquid crystal panels 40R, 40G, and 40B enter the cross dichroic prism 30 again, where these three light components are integrated together so as to be formed into projection light as the result of R light $R_S$ being reflected from the dichroic surface 30R, B light $B_S$ being reflected from the dichroic surface 30B, and G light $G_P$ being transmitted through the dichroic surfaces 30R and 30B. The R light $R_S$, G light $G_P$, and B light $B_S$ thus integrated together then enters the rear unit 20b of the projection optical system 20, travels to the pupil position along a path symmetrical with the illumination light with respect to the optical axis Ax, passes by the side of the total-reflection mirror 21, and enters the front unit 20a. The front unit 20a projects this light toward a screen (provided somewhere outside the figure) so as to form an enlarged image on the screen. As a result, the three color components of an image is superimposed on one another so as to be displayed as a color image on the screen.

Now, the polarization separation device 12 will be described. In the projection display apparatus 1 of this embodiment, as the polarization separation device 12, a birefringent diffractive optical element is used. The birefringent diffractive optical element is obtained by placing a medium exhibiting birefringence in close contact with the grating surface of a grating base plate having a blaze-shaped diffraction grating formed thereon. Here, as the medium exhibiting birefringence, liquid crystal is used, and the birefringent diffractive optical element is formed by placing a grating base plate 12a having a blaze-shaped diffraction grating formed thereon and a parallel plate 12c in such a way as to face each other, with liquid crystal sealed in the space between them.

The grating base plate 12a is formed by molding a plastic material. For example, the grating base plate 12a is formed by first applying an ultraviolet-setting or thermosetting resin to the surface of a glass plate, then placing a metal mold in close contact with the resin, and then applying ultraviolet rays or heat to the resin to harden it so that the pattern of a grating formed on the mold will be transferred to the resin.

The liquid crystal 12b is oriented along the grooves of the diffraction grating, and exhibits different refractive indices for a light component having a polarization plane parallel to the direction in which the grooves of the diffraction grating are arranged (i.e. the direction along the plane of FIG. 2) and for a light component having a polarization plane perpendicular to the direction in which the grooves of the diffraction grating are arranged. The grating base plate 12a is given a refractive index approximately equal to one of these two refractive indices of the liquid crystal 12b. On a light component for which the refractive indices of the grating base plate 12a and the liquid crystal 12b differ, the interface therebetween acts as a diffraction grating, and thus this light component is diffracted so as to turn its travel direction. By contrast, on a component for which the refractive indices of the grating base plate 12a and the liquid crystal 12b are equal, the interface therebetween does not act as a diffraction grating, and thus this light component is allowed to travel straight. Accordingly, the light coming from the light source 11 and having random polarization planes is separated into two types of light that have polarization planes perpendicular to each other and that travel in different directions from each other, i.e. P-polarized light and S-polarized light.

It is preferable that the refractive index N of the grating base plate 12a and the refractive indices No and Ne, for ordinary light and extraordinary light respectively, of the liquid crystal 12b satisfy the relation |N−No|<0.03 or |N−Ne|<0.03. Otherwise, the interface between the grating base plate 12a and the liquid crystal 12b, which should not act as a diffraction grating on the light component of one of the two polarization types, acts to a certain degree as a diffraction grating on that light component, and thereby degrades the conversion efficiency of polarization separation.

If it is assumed that the refractive index N of the grating base plate 12a is approximately equal to the refractive index No of the liquid crystal 12b, then the height h of the blaze-shaped diffraction grating formed on the grating base plate 12a is given by h=λ/|N−Ne|. Here, λ represents the reference wavelength, which is set at a wavelength around the center of the entire wavelength range of the light that the projection display apparatus 1 uses for projection. For example, if λ=550 nm, N=1.49, and Ne=1.67, then h=3.06 μm.

On the other hand, the pitch p of the blaze-shaped diffraction grating depends on at what angle θ the two light components having mutually perpendicular polarization planes are separated from each other, and is given by p=λ/sin (θ). The separation angle θ is determined in accordance with the overall construction of the projection display apparatus 1 and various factors such as the focal lengths of the lenses used therein. For example, if the separation angle θ between the two light components is 5°, then p=6.31 μm.

To enhance the durability of the grating base plate 12a and the liquid crystal 12b, it is essential to prevent their exposure to unnecessary light such as ultraviolet and infrared rays. In the projection display apparatus 1, this is achieved by disposing the UV/IR cut filter 17 immediately after the reflector 16. Moreover, the grating base plate 12a and the liquid crystal 12b are arranged near the light source 11 and the reflector 16, and are thus prone to become hot. Since the refractive index of liquid crystal varies to some extent with temperature, it is preferable to determine the height h and the pitch p of the diffraction grating on the basis of the refractive index that the liquid crystal exhibits at the temperature at which it is expected to be used.

Figure 3:
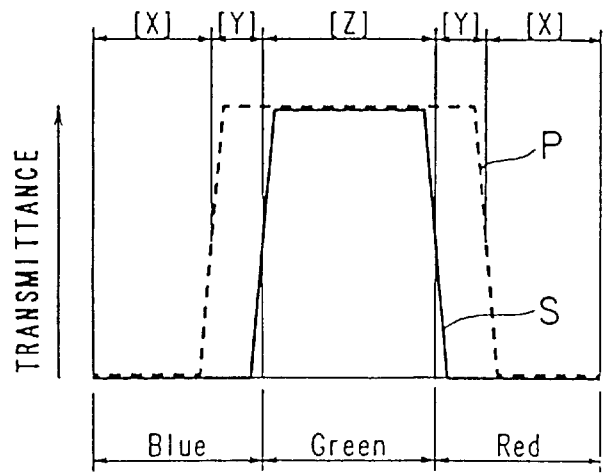
FIG. 3 is a diagram schematically showing the spectral transmittance of a dichroic surface that transmits G light.

The wavelength-specific polarization conversion device 13 is realized by the use of a dichroic surface. First, the characteristics of a dichroic surface with P-polarized and S-polarized light will be described. FIG. 3 schematically shows the spectral transmittance of a dichroic surface that transmits G light. A dichroic surface exhibits a narrow transmittance range with S-polarized light and a wide transmittance range with P-polarized light. Therefore, in a dichroic surface designed to transmit all light within the wavelength range Z of G light, the wavelength ranges of R and B light include wavelength ranges X in which both P-polarized and S-polarized light is reflected and wavelength ranges Y in which only S-polarized light is reflected and P-polarized light is transmitted.

Figure 4A:
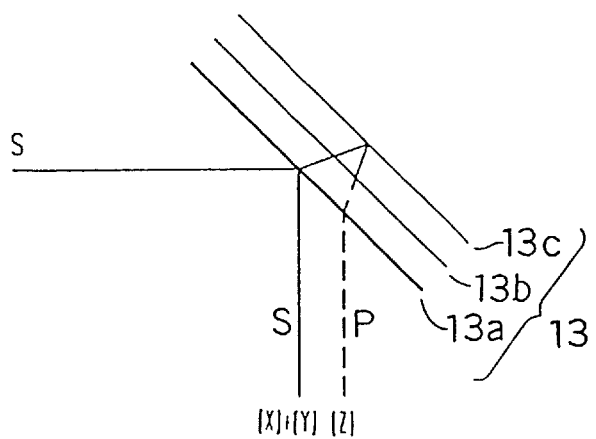
FIGS. 4A and 4B are diagrams schematically showing the structure of the wavelength-specific polarization conversion device employed in the first embodiment and its action on S-polarized and P-polarized white light.
Figure 4B:
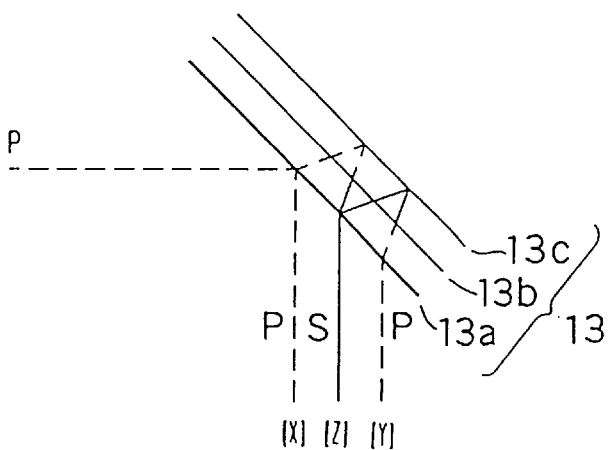
Figure 5A:
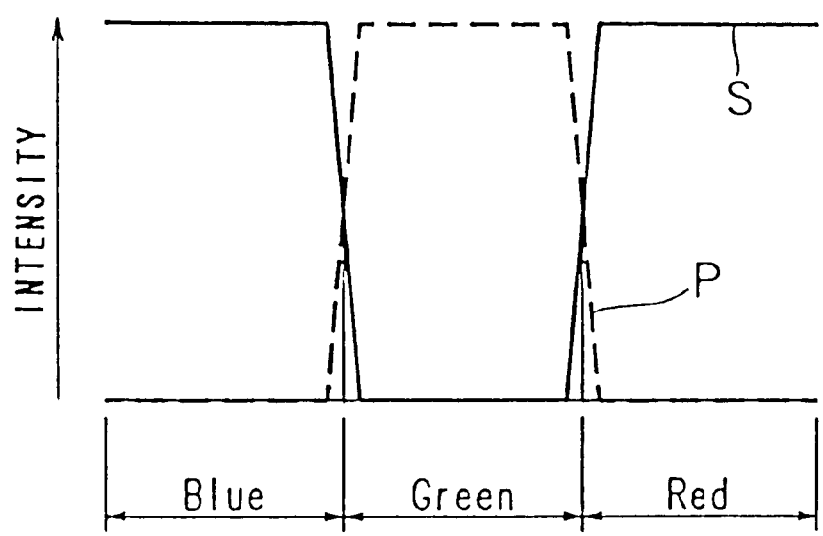
FIGS. 5A and 5B are diagrams schematically showing the spectral distribution of S-polarized and P-polarized white light acted upon by the wavelength-specific polarization conversion device employed in the first embodiment.
Figure 5B:
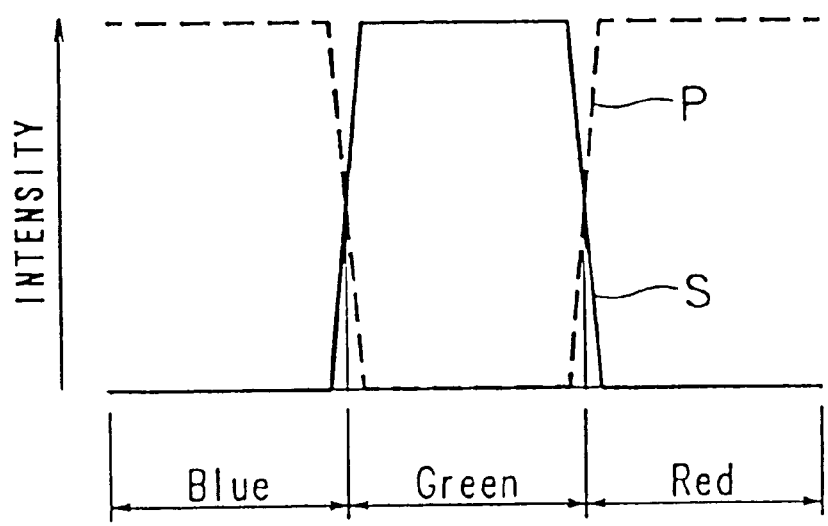

Now, consider a case in which R, G, and B light is separated by the use of this dichroic surface and all of the light having passed therethrough is subjected to polarization conversion. By this polarization conversion, the group of S-polarized light including $R_S$, $G_S$, and $B_S$ immediately after separation by the polarization separation device 12 is converted into a group of light $R_S$, $G_P$, and $B_S$, and in this way only G light, which is here treated as the light of the particular wavelength range, is converted to have a different polarization plane from R and B light, just as intended. However, of the group of P-polarized light including $R_P$, $G_P$, and $B_P$ immediately after separation, the R and B light within the wavelength ranges Y is, together with G light, transmitted through the dichroic surface and is thus subjected to polarization conversion. Thus, after polarization conversion, this group of light includes $R_P+R_S$, $G_S$, and $B_P+B_S$, which means that it is impossible to convert only G light, i.e. the light of the particular wavelength range, into light having a different polarization plane from R and B light, To overcome this problem, in the projection display apparatus 1, the wavelength-specific polarization conversion device 13 is so designed that, of the light passing through the dichroic surface, not all but only G light within the wavelength ranges Z is subjected to polarization conversion and R and B light within the wavelength ranges Y is not subjected to polarization conversion. Figs. 4A and 4B schematically show the structure of the wavelength-specific polarization conversion device 13 and its action on S-polarized and P-polarized white light, and FIGS. 5A and 5B schematically show the spectral distribution of S-polarized and P-polarized white light acted upon by the wavelength-specific polarization conversion device 13. Of these figures, FIGS. 4A and 5A show a case in which the incoming light is S-polarized, and FIGS. 4B and 5B show a case in which the incoming light is P-polarized.

The wavelength-specific polarization conversion device 13 is composed of a dichroic surface 13a that transmits G light, i.e. all light of the particular wavelength range Z, a quarter-wave plate 13b that acts on light of the wavelength range Z, and a total-reflection mirror 13c. The dichroic surface 13a and the total-reflection mirror 13c are so disposed as to face the quarter-wave plate 13b from both sides thereof, with these three components arranged parallel to one another.

As shown in FIG. 4A, the S-polarized white light entering the wavelength-specific polarization conversion device 13 is separated into light of the wavelength range Z (G light), which is transmitted through the dichroic surface 13a, and light of the wavelength ranges X and Y (R and B light), which is reflected from the dichroic surface 13a. The light of the wavelength range Z transmitted through the dichroic surface 13a is then transmitted through the quarter-wave plate 13b and thereby converted into circularly polarized light, and is then reflected from the total-reflection mirror 13c.

The light reflected from the total-reflection mirror 13c is transmitted through the quarter-wave plate 13b again and thereby converted into P-polarized light. Then, the light of the wavelength range Z, now P-polarized, is transmitted through the dichroic surface 13a so as to travel in the same direction as the light of the wavelength ranges X and Y, which has been reflected from the dichroic surface 13a and which has remained S-polarized. As a result, as shown in FIG. 5A, white light is obtained that exhibits clear inversion of the polarization plane at the boundaries between the wavelength range Z and the wavelength ranges Y.

As shown in FIG. 4B, the P-polarized white light entering the wavelength-specific polarization conversion device 13 is separated into light of the wavelength range Z (G light) and of the wavelength ranges Y (part of R and B light), which is transmitted through the dichroic surface 13a, and light of the wavelength ranges X (R and B light), which is reflected from the dichroic surface 13a. The light of the wavelength ranges Z and Y transmitted through the dichroic surface 13a is then transmitted through the quarter-wave plate 13b and thereby converted into circularly polarized light, and is then reflected from the total-reflection mirror 13c.

The light reflected from the total-reflection mirror 13c is transmitted through the quarter-wave plate 13b again and thereby converted into S-polarized light. Then, the light of the wavelength ranges Z and Y, now S-polarized, is separated into light of the wavelength range Z, which is transmitted through the dichroic surface 13a, and light of the wavelength ranges Y, which is reflected from the dichroic surface 13a exactly because it has now become S-polarized. The light of the wavelength range Z transmitted through the dichroic surface 13a travels in the same direction as the light of the wavelength ranges X, which has been reflected from the dichroic surface 13a and which has remained P-polarized.

The S-polarized light of the wavelength ranges Y reflected from the dichroic surface 13a is reflected from the total-reflection mirror 13c again and thereby directed back to the dichroic surface 13a. Meanwhile, this light is transmitted through the quarter-wave plate 13b twice and thereby converted into P-polarized light. Then, this light of the wavelength ranges Y, now converted back into P-polarized light, is transmitted through the dichroic surface 13a so as to travel in the same direction as the light of the wavelength ranges X and Z. As a result, as shown in FIG. 5B, white light is obtained that exhibits clear inversion of the polarization plane at the boundaries between the wavelength range Z and the wavelength ranges Y.

In this way, the wavelength-specific polarization conversion device 13 can subject only G light of the particular wavelength range Z to polarization conversion both with S-polarized white light and P-polarized white light. Moreover, this wavelength-specific polarization conversion device 13 functions as a flat mirror, and therefore maintains the angle between the two groups of light incident thereon from the polarization separation device 12 when reflecting them. Accordingly, there is no need to give consideration to the presence of the wavelength-specific polarization conversion device 13 in determining the separation angle at which the polarization separation device 12 separates P-polarized and S-polarized light and the convergence positions of the convergence optical system 14.

Table 1 shows an example of the practical structure of the dichroic surface 13a. This dichroic surface 13a treats a wavelength range approximately from 510 to 580 nm as the particular wavelength range, and is composed of 24 layers. The 0th layer is a base plate, and the 25th layer is air. Symbols Ni and Ti are used to represent the refractive index and the optical film thickness ($\lambda$=443.1 nm), respectively.

TABLE 1

| Layer | Ni | Ti | Layer | Ni | Ti | Layer | Ni | Ti |
| --- | --- | --- | --- | --- | --- | --- | --- | --- |
| 25 | 1 | Air | 16 | 2.3 | 0.357 | 7 | 1.47 | 0.349 |
| 24 | 1.385 | 0.140 | 15 | 1.47 | 0.699 | 6 | 2.3 | 0.379 |
| 23 | 1.47 | 0.874 | 14 | 2.3 | 0.387 | 5 | 1.47 | 0.201 |
| 22 | 2.3 | 0.331 | 13 | 1.47 | 0.324 | 4 | 2.3 | 0.678 |
| 21 | 1.47 | 0.347 | 12 | 2.3 | 0.226 | 3 | 1.47 | 0.419 |
| 20 | 2.3 | 0.626 | 11 | 1.47 | 0.301 | 2 | 2.3 | 1.079 |
| 19 | 1.47 | 0.424 | 10 | 2.3 | 0.410 | 1 | 1.62 | 0.140 |
| 18 | 2.3 | 0.287 | 9 | 1.47 | 0.691 | 0 | 1.52 | Base |
| 17 | 1.47 | 0.351 | 8 | 2.3 | 0.353 | | | |

Figure 6:
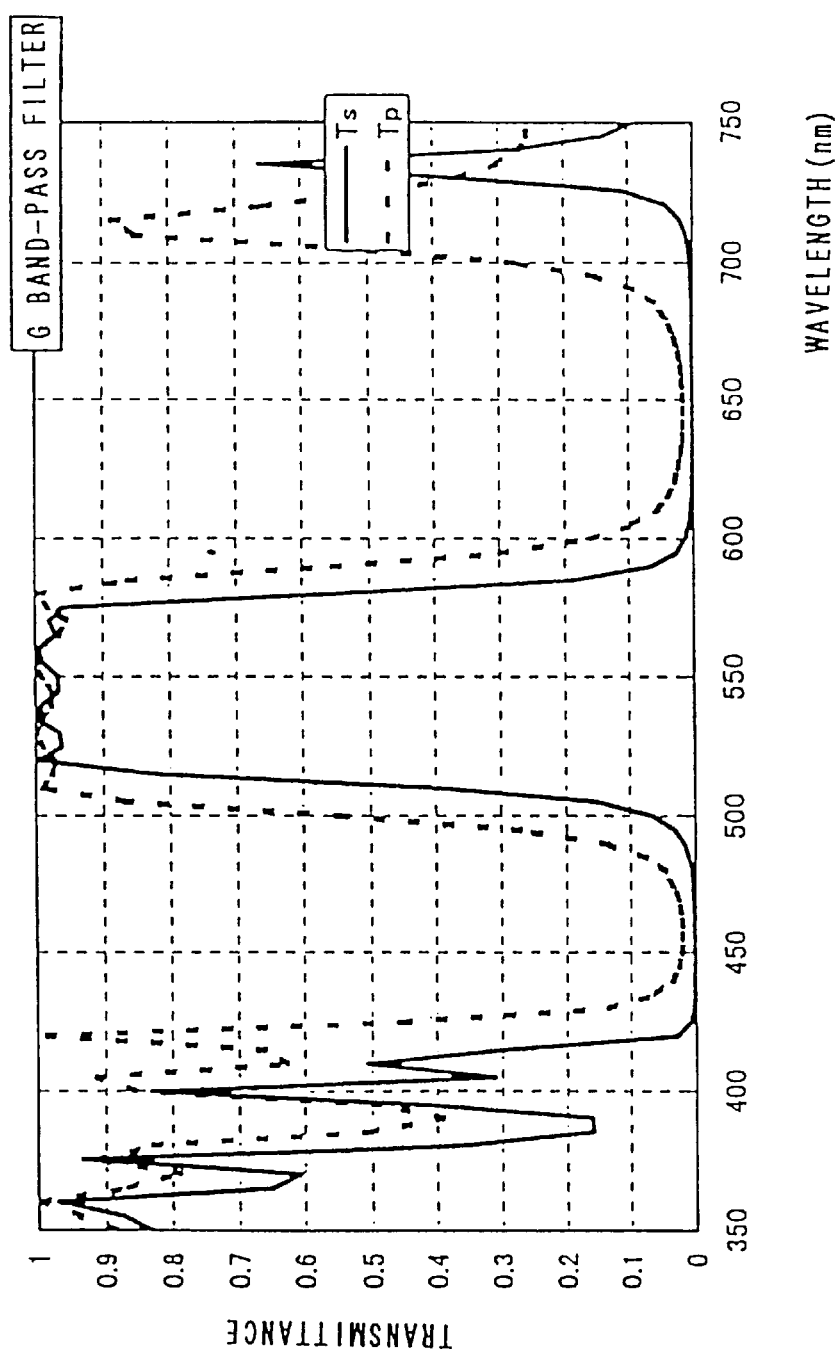
FIG. 6 is a diagram showing the spectral transmittance of the dichroic surface constituting the wavelength-specific polarization conversion device employed in the first embodiment.

FIG. 6 shows the spectral transmittance of the dichroic surface 13a having the structure described above. In FIG. 6, the transmittance with S-polarized light is plotted with a solid line, and the transmittance with P-polarized light is plotted with a broken line. The wavelength range corresponding to G light spreads around 500 nm, where the dichroic surface 13a exhibits a roughly 20nm wider transmittance range with P-polarized light than with S-polarized light.

Figure 7A:
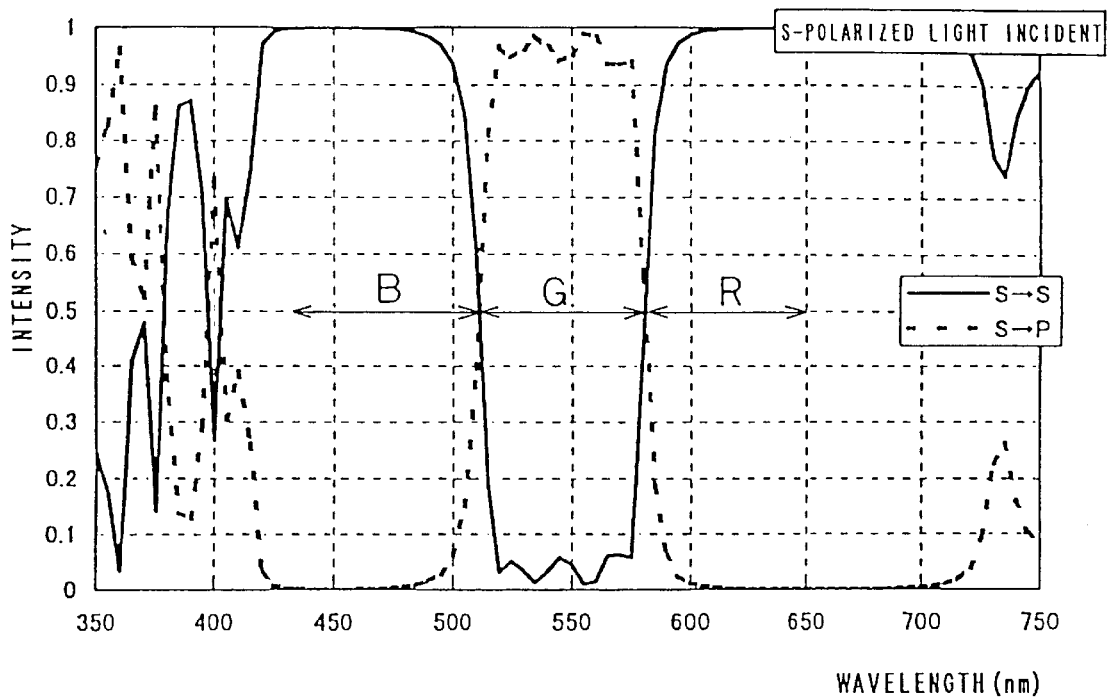
FIGS. 7A and 7B are diagrams showing the spectral intensity distribution of the light reflected from the wavelength-specific polarization conversion device employed in the first embodiment.
Figure 7B:
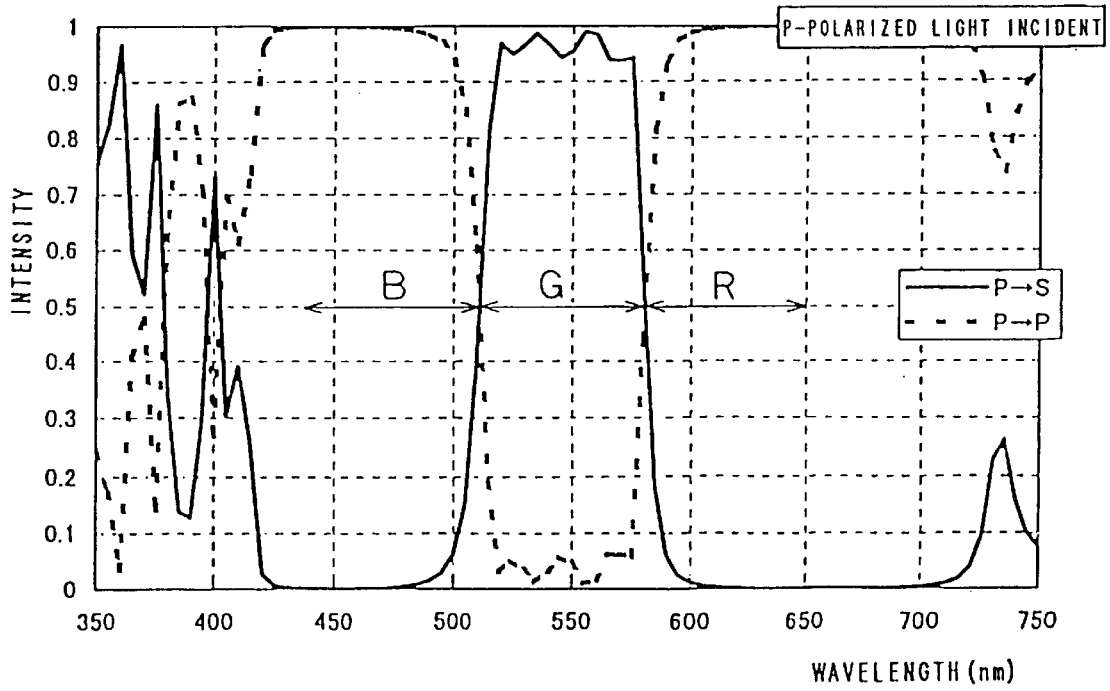

In reality, the light transmitted through the dichroic surface 13a does not Simply shuttle between the dichroic surface 13a and the total-reflection mirror 13c once or twice as described above, but is reflected between the dichroic surface 13a and the total-reflection mirror 13c a plurality of times according to transmittance and reflectance, and is subjected to polarization conversion while undergoing such multiple reflection. FIGS. 7A and 7B are diagrams showing the intensity distribution of the light reflected from the wavelength-specific polarization conversion device, as calculated in consideration of multiple reflection. FIG. 7A shows a case in which the incoming light is S-polarized, and FIG. 7B shows a case in which the incoming light is P-polarized; the S-polarized and P-polarized light included in the reflected light is plotted with solid lines and broken lines, respectively. Irrespective of whether the incoming light is S-polarized or P-polarized, polarization conversion is effected within the same wavelength range.

The light shown in FIG. 7B will later be wholly subjected to polarization conversion by the half-wave plate 15. Thereafter, this light exhibits almost the same polarization planes and intensity distribution as the light shown in FIG. 7A. In this way, white light of which only the G light component has been converted into P-polarized light, i.e. white light including $R_S$, $G_P$, and $B_S$, is directed to the cross dichroic prism 30.

The dichroic surface 30R, which is provided to separate white light into R light, on the one hand, and G and B light, on the other hand, is designed to reflect S-polarized light at a reflectance higher than 50° at the longer-wavelength end of the particular wavelength range. Similarly, the dichroic surface 30B, which is provided to separate white light into B light, on the one hand, and G and R light, on the other hand, is designed to reflect S-polarized light at a reflectance higher than 50% at the shorter-wavelength end of the particular wavelength range. Even with such design, as described above, the wavelength range in which P-polarized light is transmitted is wider than the wavelength range in which S-polarized light is transmitted, and therefore the reflectance for P-polarized light at the longer-wavelength and shorter-wavelength ends of the particular wavelength range is lower than 50%. That is, the reflectance for R light $R_S$ and B light $B_S$ at and around both ends of the particular wavelength range is improved, and the transmittance for G light $G_p$ at and around both ends of the particular wavelength range is improved.

Figure 9:
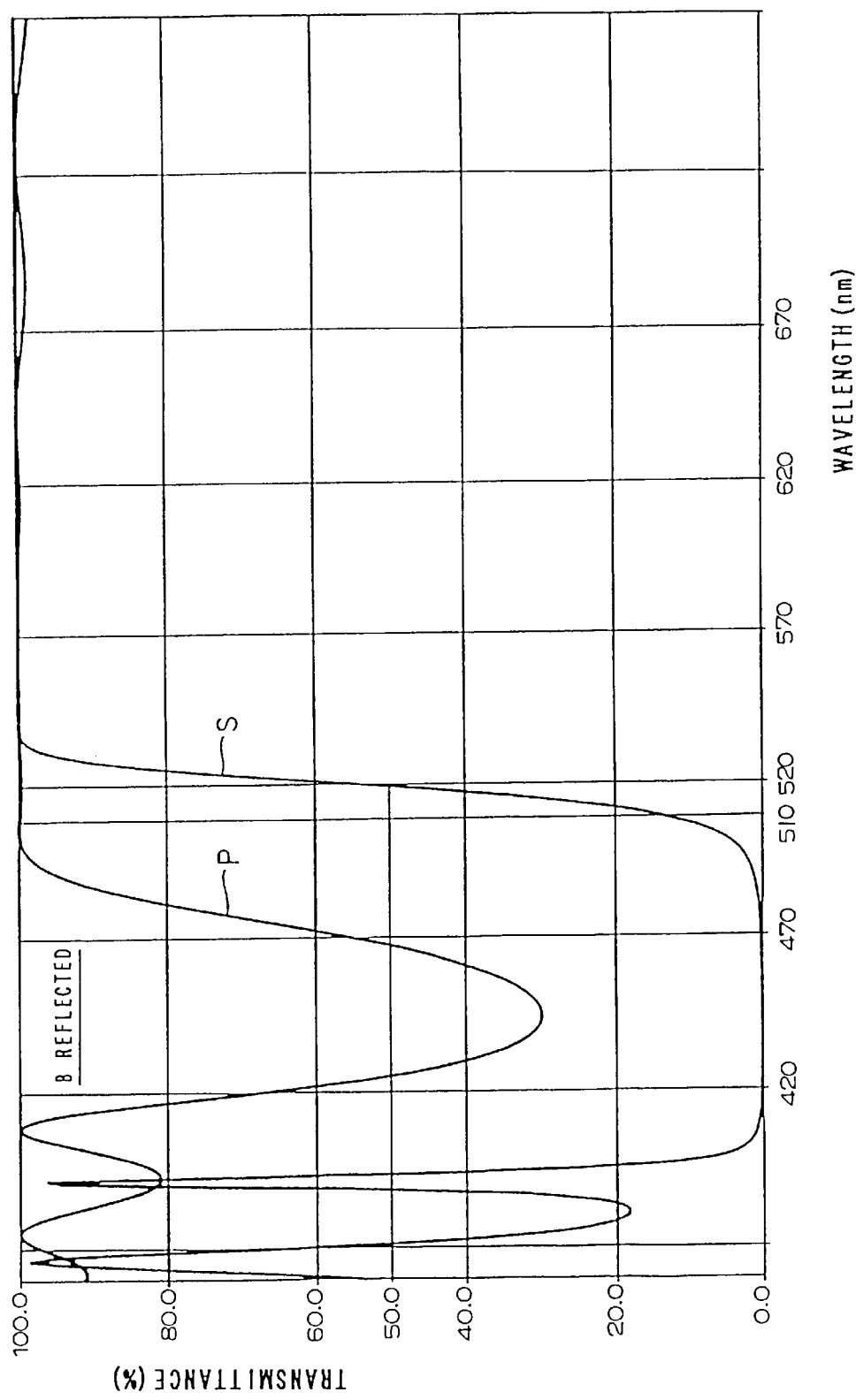
FIG. 9 is a diagram showing the spectral transmittance of the dichroic surface, for reflecting B light, of the cross dichroic prism employed in the first embodiment.

FIGS. 8 and 9 show the actual spectral transmittance (at an angle of incidence of 45°) of the dichroic surfaces 30R and 30B, respectively. As shown in FIG. 8, the dichroic surface 30R for reflecting R light has its cutoff wavelength for S-polarized light, i.e. the wavelength at which the transmittance for S-polarized light equals to 50%, set approximately at 570 nin, and reflects about 90% of S-polarized light at the longer-wavelength end (580 nm) of the particular wavelength range. On the other hand, as shown in FIG. 9, the dichroic surface 30B for reflecting B light has its cutoff wavelength for S-polarized light set approximately at 520 nm, and reflects about 90% of S-polarized light at the shorter-wavelength end (510 nm) of the particular wavelength range. The cutoff wavelength for P-polarized light of the dichroic surfaces 30R and 30B is approximately 620 nm and 470 nm, respectively, and the transmittance for P-polarized light at both ends of the particular wavelength range is approximately 100%.

Accordingly, most of R light $R_S$, and B light $B_S$ is reflected so as to illuminate the liquid crystal panels 40R and 40B efficiently, and almost all of G light $G_p$ is transmitted through the dichroic surfaces 30R and 30B so as to illuminate the liquid crystal panel 40G efficiently.

The dichroic surfaces 30R and 30B act in the same manner on the R light $R_S$, G light $G_P$, and B light $B_S$ reflected from the liquid crystal panels 40R, 40G, and 40B. Accordingly, even after these components have been reflected from or transmitted through the dichroic surfaces 30R and 30B twice, 90% of their original energy in total is maintained at both ends of the particular wavelength range, and therefore almost no narrowing occurs in any of the wavelength ranges of the R, G, and B light included in the projection light. Moreover, even if the characteristics of the dichroic surfaces 30R and 30B shift to some extent leftward or rightward (i.e. with respect to the wavelength), almost no narrowing occurs in the individual wavelength ranges, and therefore it is possible to obtain stable characteristics against variation of the angles of rays.

Thus, quite naturally, a larger amount of R and B light is reflected from the dichroic surfaces 30R and 30B and a larger amount of G light is transmitted through the dichroic surfaces 30R and 30B than ever. As a result, images can be displayed with higher brightness. Moreover, the amount of light that is lost through color separation and color integration is greatly reduced. This helps eliminate stray light almost completely and thereby prevent ghosts and low contrast. Thus, the projection display apparatus 1 can display bright and high-quality images.

Figure 10:
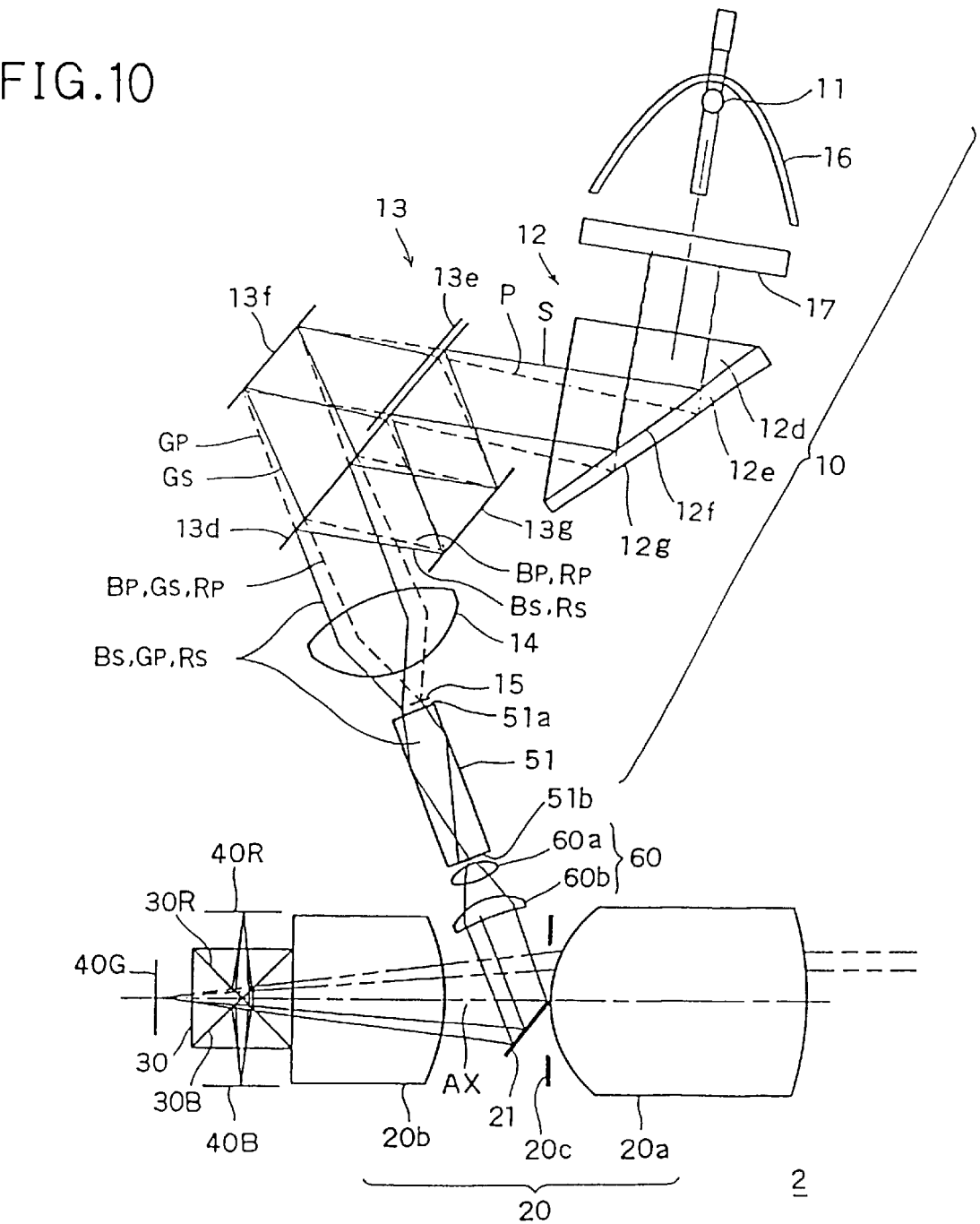
FIG. 10 is a diagram showing the overall construction of the optical system of the projection-type image display apparatus of a second embodiment of the invention.

FIG. 10 shows the overall construction of the optical system of the projection-type image display apparatus 2 of a second embodiment of the invention. Also in this projection display apparatus 2, the white light supplied from the illumination optical system 10 is subjected to color separation so as to be separated into R, G, and B light, then the thus separated R, G, and B light illuminates three liquid crystal panels individually, and then the light modulated by those three liquid crystal panels individually is integrated together and projected so as to form a color image.

The projection display apparatus 2 differs from the projection display apparatus 1 of the first embodiment in the construction of the illumination optical system 10 and in the additional disposal of a relay optical system 60 between the illumination optical system 10 and the projection optical system 20. The projection optical system 20, the total-reflection mirror 21, the cross dichroic prism 30, and the three reflection-type liquid crystal panels 40R, 40G, and 40B have the same design and functions as those described previously, and therefore overlapping descriptions will not be repeated.

The illumination optical system 10 is composed of a light source 11, a polarization separation device 12, a wavelength-specific polarization conversion device 13, a convergence optical system 14, a half-wave plate 15, a reflector 16, a UV/IR cut filter 17, and a kaleidoprism 51. The light source 11 and the UV/IR cut filter 17 are the same as those described previously. The reflector 16 has an ellipsoid surface, and at the focus thereof is disposed the light source 11. The reflector 16 reflects the light emitted from the light source 11 in such a way as to form the light into a parallel beam.

In the projection display apparatus 2, as the polarization separation device 12, a polarization separation wedge prism is used that is composed of a triangular prism 12d having a rectangular-equilateral-triangle-shaped cross section and a flat plate 12e having a wedge-shaped cross section. The wedge-shaped flat plate 12e is, at one surface thereof, cemented on the slant surface of the triangular prism 12d, and a polarization separation surface 12f is formed on the cementing surface therebetween. The other surface of the wedge-shaped flat plate 12e is formed into a total-reflection surface 12g. The polarization separation surface 12f reflects S-polarized light and transmits P-polarized light.

The light emitted from the light source 11 and having random polarization planes is reflected from the reflector 16 so as to strike the polarization separation surface 12f, which separates the light into S-polarized and P-polarized light by reflecting the former and transmitting the latter. The P-polarized light is then reflected from the total-reflection surface 12g, and thus, since the total-reflection surface 12g is arranged at an angle to the polarization separation surface 12f, the P-polarized light and S-polarized light travel in different directions at an angle to each other.

The wavelength-specific polarization conversion device 13 is composed of a dichroic surface 13d, a half-wave plate 13e, and two total-reflection mirrors 13f and 13g. Also in the projection display apparatus 2, the wavelength range of G light is treated as the particular wavelength range, and therefore the dichroic surface 13d is designed to transmit light of a wavelength range approximately from 510 to 580 nm and reflect light of other wavelength ranges.

The half-wave plate 13e is so large as to receive the whole beam exiting from the polarization separation device 12, and the dichroic surface 13d is approximately twice as large as the half-wave plate 13e. The dichroic surface 13d is arranged in such a way that the light coming from the polarization separation device 12 strikes half the area of the dichroic surface 13d at an angle of incidence of approximately 30°. The half-wave plate 13e is arranged close to the dichroic surface 13d and opposite to the polarization separation device 12 in such a way as to face that portion of the dichroic surface 13d which is struck by the light coming from the polarization separation device 12.

The total-reflection mirror 13f is arranged on that side of the dichroic surface 13d opposite to the polarization separation device 12 and parallel to the dichroic surface 13d in such a way as to reflect the light coming from the polarization separation device 12 and transmitted through the dichroic surface 13d and thereby direct this light to that portion of the dichroic surface 13d which does not face the half-wave plate 13e. The total-reflection mirror 13g is arranged on that side of the dichroic surface 13d facing the polarization separation device 12 and parallel to the dichroic surface 13d in such a way as to reflect the light coming from the polarization separation device 12 and reflected from the dichroic surface 13d and thereby direct this light to that portion of the dichroic surface 13d which does not face the half-wave plate 13e. The distances from the dichroic surface 13d to the two total-reflection mirrors 13f and 13g are equal.

The P-polarized white light coming from the polarization separation device 12 strikes the dichroic surface 13d, and is separated into R light Rp and B light $B_p$ reflected from the dichroic surface 13d, on the one hand, and G light $G_p$ transmitted therethrough, on the other hand. The reflected R light $R_p$ and B light $B_P$, is then reflected from the total-reflection mirror 13g, and then strikes the dichroic surface 13d again and is reflected therefrom again. The G light $G_p$ transmitted through the dichroic surface 13d is then transmitted through the half-wave plate 13e and thereby converted into S-polarized light. Then, the G light $G_S$, now S-polarized, is reflected from the total-reflection mirror 13f, and then strikes the dichroic surface 13d again and is transmitted therethrough so as to be integrated together with the R light $R_S$, and B light $B_p$ reflected therefrom.

The S-polarized white light coming from the polarization separation device 12 strikes the dichroic surface 13d, and is separated into R light $R_S$ and B light $B_S$ reflected from the dichroic surface 13d, on the one hand, and G light $G_S$ transmitted therethrough, on the other hand. The reflected R light $R_S$ and B light $B_S$ is then reflected from the total-reflection mirror 13g, and then strikes the dichroic surface 13d again and is reflected therefrom again. The G light $G_S$ transmitted through the dichroic surface 13d is then transmitted through the half-wave plate 13e and thereby converted into P-polarized light. Then, the G light $G_P$, now P-polarized, is reflected from the total-reflection mirror 13f, and then strikes the dichroic surface 13d again and is transmitted therethrough so as to be integrated together with the R light $R_S$ and B light $B_S$ reflected therefrom.

Thus, the P-polarized light coming from the polarization separation device 12 is converted into light $R_P$, $G_S$, and $B_P$ and the S-polarized light coming therefrom is converted into light $R_S$, $G_P$, and $B_S$. The P-polarized and S-polarized light, when entering the wavelength-specific polarization conversion device 13, travels along paths that are at an angle to each other, and the wavelength-specific polarization conversion device 13, having the structure described above, maintains this angle. Accordingly, the two groups of light, i.e. $R_P$, $G_S$, and $B_P$ on the one hand, and $R_S$, $G_P$, and $B_S$, on the other hand, are at the same angle to each other when exiting from the wavelength-specific polarization conversion device 13 as when entering it.

The convergence optical system 14 is composed of a single condenser lens, and makes the two groups of light, i.e. $R_P$, $G_S$, and $B_P$, on the one hand, and Rs, $G_P$, and $B_S$, on the other hand, converge on different convergence positions. The half-wave plate 15 is disposed in the vicinity of the convergence position of the group of light $R_P$, $G_S$, and $B_P$, and accordingly this group of light, as it is transmitted through the half-wave plate 15, is converted into light Rs, $G_P$, and $B_S$, i.e. light of the same composition as the other group. The convergence optical system 14 may be composed of a plurality of lenses.

The kaleidoprism 51 has the shape of a prism with a polygonal cross section, and has the inner surfaces of all side walls thereof formed into total-reflection surfaces. The kaleidoprism 51 is arranged with one end surface 51a thereof placed in the vicinity of the two convergence positions of the convergence optical system 14 in such a way that the two groups of light that are made to converge by the convergence optical system 14 individually form images of the light source 11 on the end surface 51a. The light of those light-source images, as it travels inside the kaleidoprism 51, is reflected from the side surfaces of the kaleidoprism 51a plurality of times so as to have substantially uniform intensity distribution, and then exits from the other end surface 51b of the kaleidoprism 51. Accordingly, the illumination optical system 10 outputs white light that includes only S-polarized R light $R_S$, P-polarized G light $G_P$, and S-polarized B light $B_S$, and that has uniform intensity distribution.

The relay optical system 60 is composed of two lenses 60a and 60b. The lens 60a is disposed close to the kaleidoprism 51, and the lens 60b is disposed lose to the projection optical system 20. The relay optical system 60 serves to make the light exiting from the kaleidoprism 51 illuminate the whole surfaces of the liquid crystal panels 40R, 40G, and 40B.

The light coming from the illumination optical system 10 and introduced into the projection optical system 20 by the relay optical system 60 and the total-reflection mirror 21 is then subjected to color separation by the cross dichroic prism 30 so as to be separated into R, G, and B light and thereby formed into illumination light for illuminating the liquid crystal panels 40R, 40G, and 40B individually. The illumination light is then modulated by and reflected from the liquid crystal panels 40R, 40G, and 40B individually, and is then integrated together by the cross dichroic prism 30 so as to be formed into projection light.

As described previously, the dichroic surfaces 30G and 30B are designed to transmit almost all of P-polarized light and reflect almost all of S-polarized light around both ends of a particular wavelength range. Here, G light is treated as the light of the particular wavelength range, and includes only P-polarized light. Accordingly, G light is, even around both ends of its wavelength range, transmitted through the dichroic surfaces 30G and 30B without being reflected. Thus, almost no part of G light is lost through color separation and color integration.

On the other hand, around both ends of the particular wavelength range, one half of R and B light is S-polarized and the other half is P-polarized. Thus, most of S-polarized R and B light $R_S$ and $B_S$ is reflected from the dichroic surfaces 30G and 30B, and most of P-polarized R and B light $R_p$ and $B_p$ is transmitted through the dichroic surfaces 30G and 30B. That is, around both ends of the particular wavelength range, the loss of R and B light due to the dichroic surfaces 30G and 30B is roughly the same as in conventional image display apparatuses in which white light including only S-polarized light is shone on dichroic surfaces that exhibit a transmittance of 50% at both ends of the wavelength range of G light.

However, in the projection display apparatus 2, in which almost no part of G light is lost, it is possible to reduce the loss of light approximately to half and thereby achieve display of bright images. In addition, it is possible to reduce stray light approximately to half and thereby greatly reduce degradation of image quality due to stray light.

Figure 11:
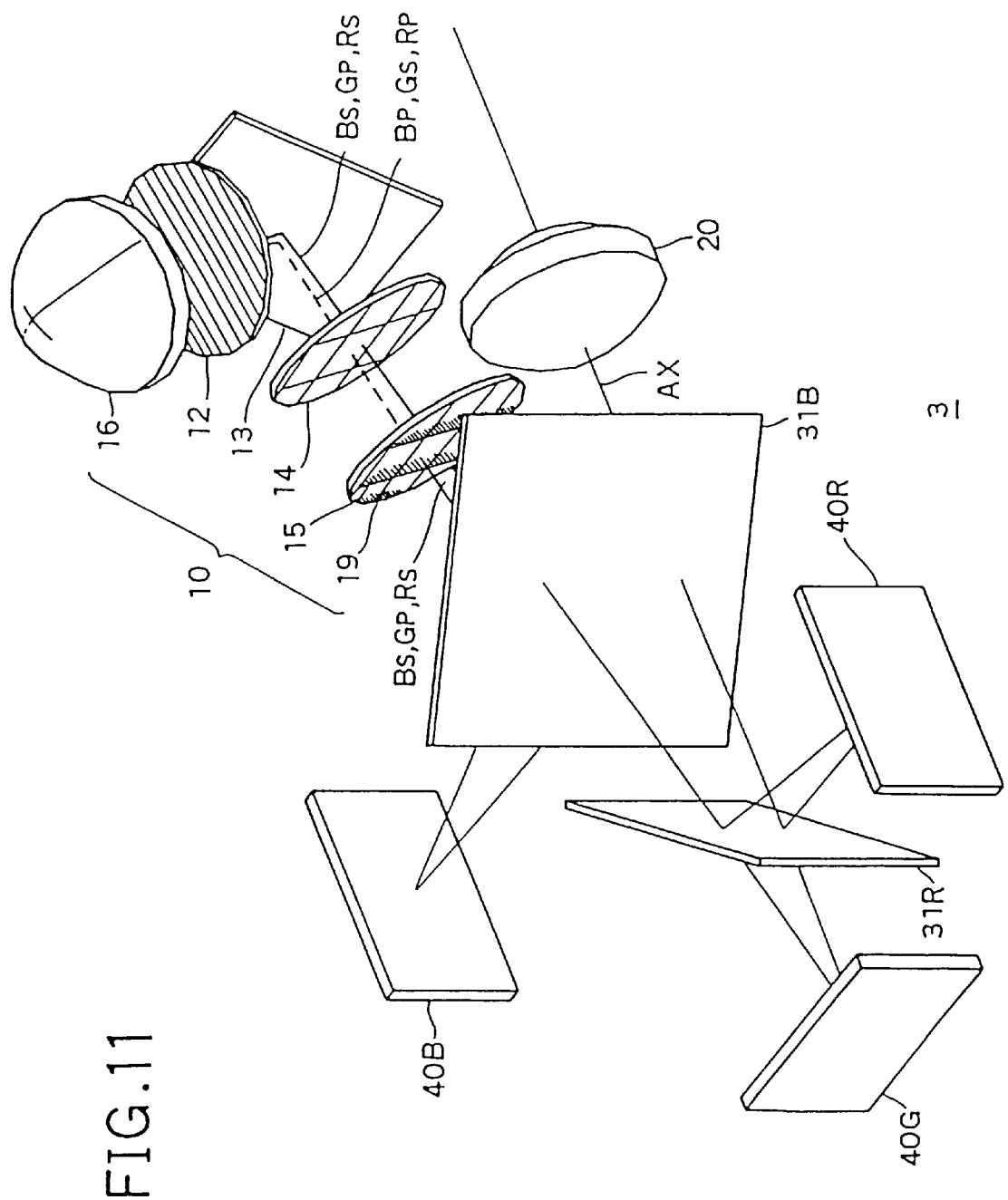
FIG. 11 is a perspective view showing the overall construction of the optical system of the projection-type image display apparatus of a third embodiment of the invention.
Figure 12:
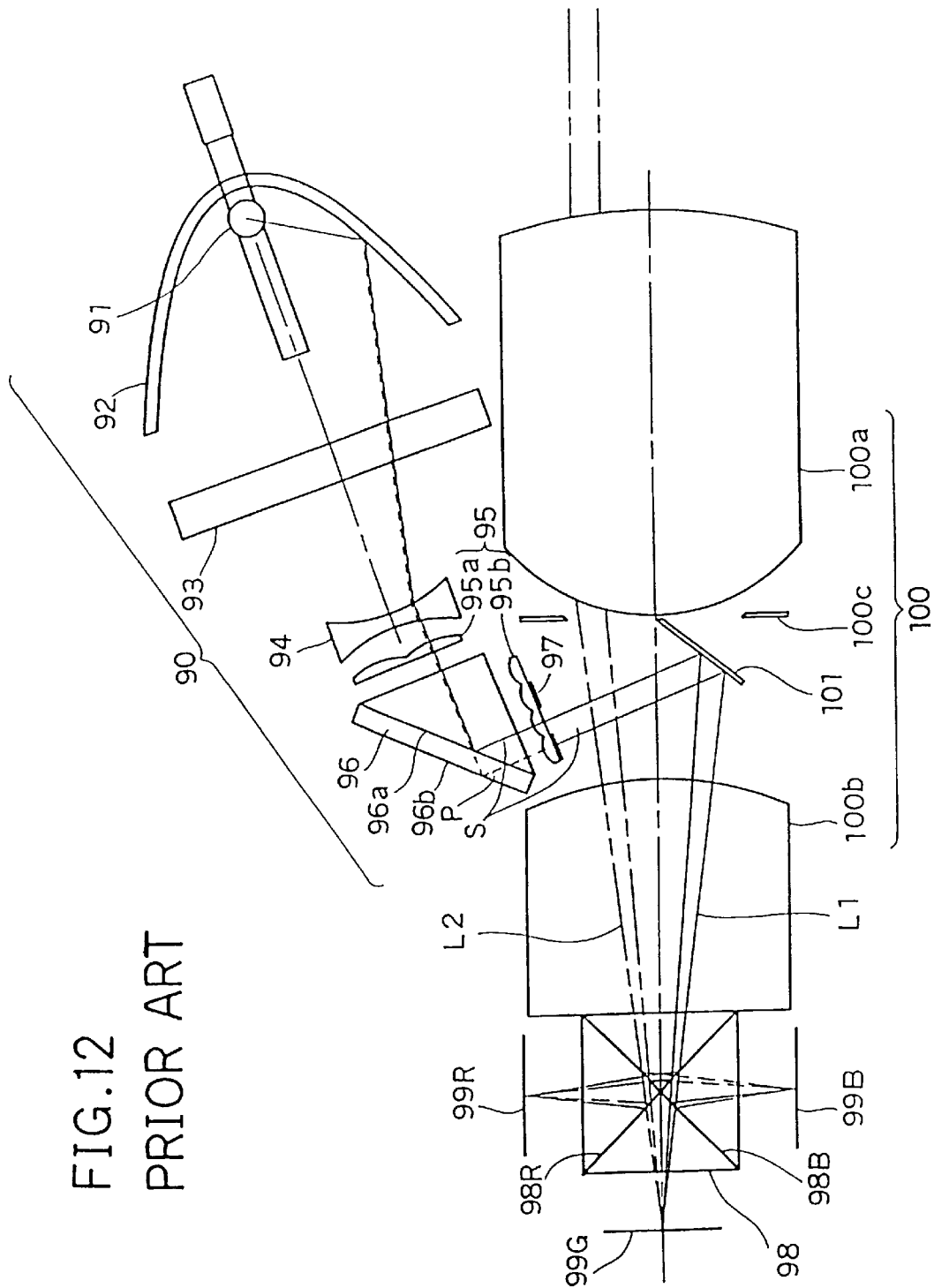
FIG. 12 is a diagram showing the construction of the optical system of a conventional projection-type image display apparatus.
Figure 13:
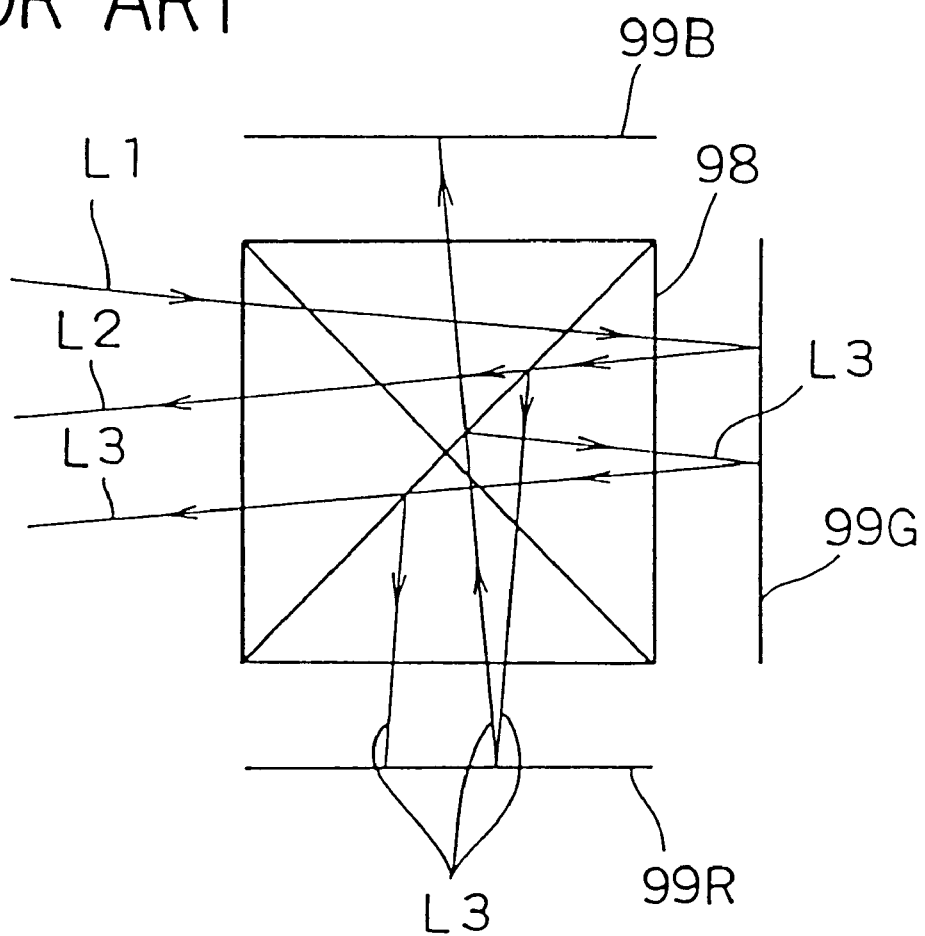
FIG. 13 is a diagram schematically illustrating stray light as is observed in the cross dichroic prism in the conventional projection-type image display apparatus.

FIG. 11 is a perspective view showing the overall construction of the optical system of the projection-type image display apparatus 3 of a third embodiment of the invention. In this projection display apparatus 3, in place of the cross dichroic prism 30 used in the projection display apparatus 1 of the first embodiment, two dichroic mirrors 31R and 31B are used so that color separation and color integration of light will be performed in two stages and the total-reflection mirror 21 is omitted so that illumination light will be shone directly on the dichroic mirror 31B.

The illumination optical system 10, like that of the projection display apparatus 1, is provided with a polarization separation device 12 realized by the use of a birefringent diffractive optical element, a wavelength-specific polarization conversion device 13 that is composed of a dichroic surface, a quarter-wave plate, and a total-reflection mirror and that converts separated P-polarized and S-polarized white light into a group of $R_P$, $G_S$, and $B_p$ and a group of $R_S$, $G_P$, and $B_S$, respectively, a convergence optical system 14 that serves also as the first lens array of an integrator, a lens array 19 that serves as the second lens array of the integrator, and a half-wave plate 15 disposed in the vicinity of the convergence position on which the light $R_P$, $G_S$, and $B_S$, is made to converge by the convergence optical system 14. The illumination optical system 10 is also provided with a light source, a UV/IR cut filter, and a concave lens like those of the projection display apparatus 1, but these components are not shown in FIG. 11 because they lie behind other components.

The dichroic mirror 31R reflects R light and transmits G and B light, and the dichroic mirror 31B reflects B light and transmits R and G light. These dichroic mirrors 31R and 31B have the same characteristics as the dichroic surfaces 30R and 30B of the projection display apparatus 1.

The dichroic mirrors 31R and 31B are arranged each at an angle of 45° to the optical axis Ax of the projection optical system 20 and perpendicularly to each other. The liquid crystal panel 40G is arranged substantially perpendicularly to the optical axis Ax, and the liquid crystal panels 40R and 40B are arranged substantially perpendicularly to the optical axis Ax as turned by the dichroic mirrors 31R and 31B, respectively. The centers of the liquid crystal panels 40R, 40G, and 40B lie on the optical axis Ax or the turned optical axis Ax. The optical path lengths from the dichroic mirror 31B to the liquid crystal panels 40R, 40G, and 40B are equal.

The light $R_S$, $G_P$, and $B_S$ coming from the illumination optical system 10 strikes the dichroic mirror 31B, and is separated into light $R_S$ and $G_p$ transmitted therethrough, on the one hand, and light BS reflected therefrom, on the other hand. The light $R_S$ and $G_p$ transmitted through the dichroic mirror 31B strikes the dichroic mirror 31R, and is separated into light $G_p$ transmitted therethrough and light $R_S$ reflected therefrom. The light $R_S$, $G_P$, and $B_S$ thus separated is, as illumination light, shone on the liquid crystal panels 40R, 40G, and 40B individually. The illumination light is then modulated by and reflected from the liquid crystal panels 40R, 40G, and 40B individually. The light reflected from the liquid crystal panels 40R, 40G, and 40B is then integrated together by the dichroic mirrors 31R and 31B successively and thereby formed into projection light. The projection light is then projected through the projection optical system 20 on a screen (provided somewhere outside the figure) so as to form an enlarged color image on the screen.

Also in this projection display apparatus 3, clear inversion of the polarization plane is observed at both ends of the particular wavelength range, i.e. the wavelength range of G light, and therefore almost no light is lost through color separation of illumination light and color integration of projection light. This makes it possible to display bright and high-quality images.

It is customary to use as a projection lens a telecentric optical system to allow both axial and off-axial rays to pass through the color-separating and color-integrating dichroic surfaces at uniform angles. This is because, unless a telecentric optical system is used, the variation of the characteristics of the dichroic surfaces causes unnecessary color shades in the displayed image between axial and off-axial rays. However, where an illumination optical system embodying the present invention is used, no such unnecessary color shades occur even if a non-telecentric optical system is used that causes axial and off-axial rays to pass through the dichroic surfaces at different angles. Using a non-telecentric optical system offers advantages such as of making the projection optical system compact. In cases where a non-telecentric optical system is used, condenser lenses or the like need to be provided immediately before the liquid crystal panels.

As described heretofore, an illumination optical system embodying the present invention prevents loss of light that occurs when the light is subjected to color separation by dichroic surfaces. Accordingly, such an illumination optical system is applicable also to projection-type image display apparatuses that use transmission-type liquid crystal panels to modulate light. An illumination optical system embodying the present invention is particularly useful in projection-type image display apparatuses, as those described above as embodiments, that use reflection-type liquid crystal panels to modulate light, because then loss of light is prevented also when the light is subjected to color integration by dichroic surfaces. Moreover, an illumination optical system embodying the present invention, which is characterized by outputting light having different polarization planes in a particular wavelength range and in other wavelength ranges, offers advantages not only in projection-type image display apparatuses but also in other types of optical apparatuses that exploit polarization.

Obviously, many modifications and variations of the present invention are possible in light of the above teachings. It is therefore to be understood that within the scope of the appended claims, the invention may be practiced other than as specifically described.

What is claimed is:

1. An illumination optical system comprising:
a polarization separation device for separating white light emitted from a light source and having random polarization planes into a first type of light and a second type of light polarized on different planes from each other and traveling in different directions from each other;
a polarization plane conversion device for rotating a polarization plane of light of a particular wavelength range included in the first and second types of light;
a convergence optical system for making the first and second types of light converge on first and second convergence positions, respectively; and
a half-wave plate, disposed near one of the first and second convergence positions, for rotating a polarization plane of the first or second type of light that converges on that convergence position.

2. An illumination optical system as claimed in claim 1, wherein the polarization plane conversion device has a dichroic surface for separating the light of the particular wavelength range from light of other wavelength ranges and a quarter-wave plate for rotating a polarization plane of the light of the particular wavelength range.

3. An illumination optical system as claimed in claim 1, wherein the polarization separation device has a separation surface for reflecting one and transmitting the other of two types of light having polarization planes perpendicular to each other.

4. An illumination optical system as claimed in claim 1, wherein the polarization separation device is provided with a first medium having a blaze-shaped diffraction grating formed thereon and a second medium having a birefringent property and disposed in close contact with the blaze-shaped diffraction grating.

5. An illumination optical system as claimed in claim 1, wherein the particular wavelength range includes a wavelength range corresponding to green.

6. An illumination optical system as claimed in claim 1, wherein the convergence optical system has a lens array composed of a plurality of lenses arranged in an array.

7. A projection-type image display apparatus comprising:
an illumination optical system having:
a polarization separation device for separating white light emitted from a light source and having random polarization planes into a first type of light and a second type of light polarized on different planes from each other and traveling in different directions from each other,
a polarization plane conversion device for rotating a polarization plane of light of a particular wavelength range included in the first and second types of light;
a convergence optical system for making the first and second types of light converge on first and second convergence positions, respectively; and
a half-wave plate, disposed near one of the first and second convergence positions, for rotating a polarization plane of the first or second type of light that converges on that convergence position;
a display device for displaying an image in accordance with image data fed thereto so as to modulate light in accordance with the image thus displayed;
a first optical system for directing light output from the illumination optical system to the display device; and
a second optical system for projecting light output from the display device.

8. A projection-type image display apparatus as claimed in claim 7, wherein the polarization plane conversion device has a dichroic surface for separating the light of the particular wavelength range from light of other wavelength ranges and a quarter-wave plate for rotating a polarization plane of the light of the particular wavelength range.

9. A projection-type image display apparatus as claimed in claim 7, wherein the polarization separation device has a separation surface for reflecting one and transmitting the other of two types of light having polarization planes perpendicular to each other.

10. A projection-type image display apparatus as claimed in claim 7, wherein the polarization separation device is provided with a first medium having a blaze-shaped diffraction grating formed thereon and a second medium having a birefringent property and disposed in close contact with the blaze-shaped diffraction grating.

11. A projection-type image display apparatus as claimed in claim 7, wherein the particular wavelength range includes a wavelength range corresponding to green.

12. A projection-type image display apparatus as claimed in claim 7, wherein the convergence optical system has a lens array composed of a plurality of lenses arranged in an array.

13. An optical system comprising:
a polarization device for polarizing white light having random polarization planes in such a way as to convert the light into light having a predetermined polarization plane; and
a polarization plane conversion device for converting a polarization plane of light of a particular wavelength range included in the light polarized by the polarization device in such a way that the light of the particular wavelength range has a different polarization plane from light of other wavelength ranges.

14. An optical system as claimed in claim 13, wherein the polarization device has a separation surface that polarizes the light emitted from the light source into two types of light having polarization planes substantially perpendicular to each other and that separates the two types of light from each other by reflecting one and transmitting the other of the two types of light.

15. An optical system as claimed in claim 14, wherein the polarization plane conversion device converts the polarization plane of the light of the particular wavelength range included in both of the two types of light separated from each other.

16. An optical system as claimed in claim 15, wherein the polarization plane conversion device converts, after converting the polarization plane of the light of the particular wavelength range, the polarization plane of one of the two types of light so that the polarization plane thereof coincides with the polarization plane of the other in a whole wavelength range including the particular wavelength range.

17. An optical system as claimed in claim 13, wherein the particular wavelength range includes a wavelength range corresponding to green.

* * * * *